(12) United States Patent
Noguchi

(10) Patent No.: US 7,138,161 B2
(45) Date of Patent: Nov. 21, 2006

(54) POLYMER PARTICLE COATED WITH SILICA, METHOD FOR PRODUCING THE SAME AND USE OF THE SAME

(75) Inventor: Yuuji Noguchi, Kanagawa (JP)

(73) Assignee: Sekisui Plastics Co., Ltd., Osaka (JP)

( * ) Notice: Subject to any disclaimer, the term of this patent is extended or adjusted under 35 U.S.C. 154(b) by 0 days.

(21) Appl. No.: 10/523,522

(22) PCT Filed: Mar. 24, 2004

(86) PCT No.: PCT/JP2004/004061

§ 371 (c)(1),
(2), (4) Date: Feb. 4, 2005

(87) PCT Pub. No.: WO2004/085493

PCT Pub. Date: Oct. 7, 2004

(65) Prior Publication Data

US 2005/0255320 A1   Nov. 17, 2005

(30) Foreign Application Priority Data

| Mar. 25, 2003 | (JP) | ............................. 2003-083027 |
| Sep. 29, 2003 | (JP) | ............................. 2003-337888 |
| Jan. 29, 2004 | (JP) | ............................. 2004-021870 |

(51) Int. Cl.
*G02B 5/02* (2006.01)
*G02B 5/128* (2006.01)

(52) U.S. Cl. ........................ 428/1.1; 428/212; 428/323; 428/404; 427/212; 349/95

(58) Field of Classification Search ................. 428/1.1, 428/403, 212, 323, 404; 427/212; 349/95
See application file for complete search history.

(56) References Cited

U.S. PATENT DOCUMENTS

| 3,025,764 | A | * | 3/1962 | McKenzie .................. 359/541 |
| 4,734,295 | A | * | 3/1988 | Liu .............................. 427/64 |
| 4,885,209 | A |   | 12/1989 | Lindner et al. ............. 428/420 |
| 5,880,885 | A | * | 3/1999 | Bailey et al. ............... 359/529 |
| 6,086,790 | A | * | 7/2000 | Hayashi et al. ............. 252/500 |
| 6,939,211 | B1 | * | 9/2005 | Taylor et al. ................. 451/60 |

FOREIGN PATENT DOCUMENTS

JP   3-244637   10/1991

(Continued)

OTHER PUBLICATIONS

English Language Abstract of JP 10-265580.

(Continued)

*Primary Examiner*—Harold Pyon
*Assistant Examiner*—Sow-Fun Hon
(74) *Attorney, Agent, or Firm*—Greenblum & Bernstein, P.L.C.

(57) ABSTRACT

A polymer particle coated with silica comprising: a polymer particle derived from a polymerizable vinyl-based monomer; and a silica film covering the polymer particle, which makes a surface of the polymer particle expose so that an aperture ratio of 0.1 to 1 is possessed and a height h of the silica film and a diameter D of the polymer particle coated with silica have a relationship of $0.5 \leq h/D < 1$, wherein the silica film includes a polyalkoxysiloxane oligomer condensate.

12 Claims, 1 Drawing Sheet

FOREIGN PATENT DOCUMENTS

| | | |
|---|---|---|
| JP | 4-258636 | 9/1992 |
| JP | 1-170924 | 7/1993 |
| JP | 10-60365 | 3/1998 |
| JP | 10-265580 | 10/1998 |
| JP | 3040705 | 3/2000 |
| JP | 2002-3517 | 1/2002 |
| JP | 2003-3030 | 1/2003 |
| JP | 2003-73405 | 3/2003 |

OTHER PUBLICATIONS

English Language Abstract of JP 1-170924.
English Language Abstract of JP 2003-73405.
English Language Abstract of JP 2003-3030.
English Language Abstract of JP 2002-3517.
English Language Abstract of JP 10-60365.
English Language Abstract of JP 4-258636.
English Language Abstract of JP 3-244637.

* cited by examiner

Fig. 1
Fig. 2
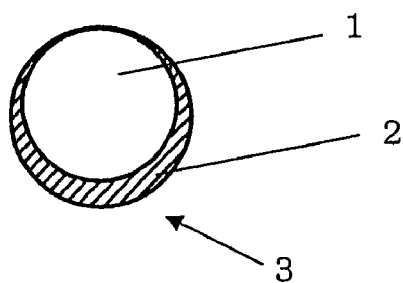
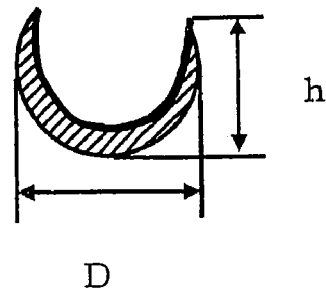
Fig. 3
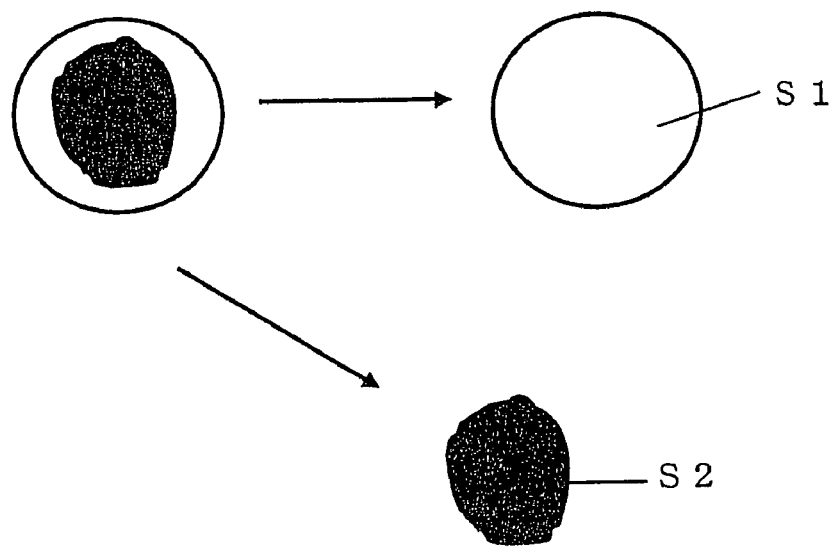
Fig. 4
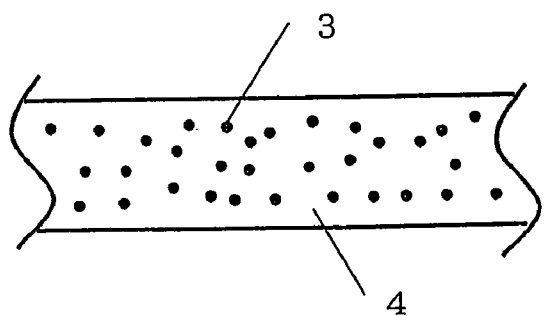

POLYMER PARTICLE COATED WITH SILICA, METHOD FOR PRODUCING THE SAME AND USE OF THE SAME

This application is a 371 of PCT/JP04/04061 filed Mar. 24, 2004.

TECHNICAL FIELD

This invention relates to a polymer particle coated with silica, a method for producing the same, and use of the same. More specifically, this invention relates to a polymer particle coated with silica having excellent light diffusibility/reflectivity, a method for producing the same, and use of the same. The polymer particle coated with silica of this invention can be particularly useful for a coating composition, a coated article, an optical member, a liquid crystal display and a light diffusible molded article.

BACKGROUND ART

Conventionally, as a coating composition including a composition for a paint material, a composition with particles blended therein has been used in order to attain various objects utilizing light diffusibility possessed by the particles. For example, for the purpose of matting surfaces of various molded articles, there has been used a coating composition in which inorganic particles such as silica particles or organic polymer particles (resin particles) are blended. Since a coated film obtained from the above coating composition has a surface on which irregularities are formed and reflection of light is diffused, a surface is matted.

In addition, in an image display device used in a TV set, a personal computer, an electronic notebook, a cellular phone, an amusement apparatus and the like, an optical sheet for diffusing transmitted light or reflected light is used as a light diffusing sheet or an antiglare sheet. Also in this optical sheet, in order to diffuse the transmitted light or the reflected light, a coated film is formed on a surface thereof. As a coating composition for forming the coated film on the surface, there has been used a composition in which inorganic particles or resin particles are blended.

For example, in the light diffusing sheet for diffusing the transmitted light, as a coating composition, there has been used a composition with particles of inorganic substances such as calcium carbonate and silica, or organic polymers such as polystyrene and silicone blended therein.

However, the inorganic particles have a problem of low dispersion stability in a binder solution, in particular, a binder solution using a transparent binder such as a polymethyl methacrylate resin as a binder resin.

In addition, in a coating composition with organic polymer particles blended therein, dispersion stability is better, but there is a problem that sufficient light diffusibility is not obtained.

On the other hand, in optical components such as an illumination apparatus cover, a lens, a light guiding plate, a video disc, a screen for a projection television, and various molded articles such as a cosmetic container, a front plate of a vending machine, a signboard, a merchandise display and a table container, in order to enhance a merchandise value such as their aesthetic property, improvement of light diffusibility has been challenged by molding the above articles using a raw material in which light diffusible particles are blended in a resin. In these molded articles, various resins, in particular, thermoplastic resins such as a polycarbonate resin, a polystyrene resin and a polyacrylate resin are used as a base material.

Conventionally, as the light diffusible particle used in the molded articles, there have been well-known inorganic particles such as glass, calcium carbonate and silica, or resin particles such as a polyacrylate resin and a polystyrene resin.

However, these molded articles have a problem that transparency is degraded due to blend of the light diffusible particles and, also, improvement in light diffusibility is not sufficient.

In response to these problems, Japanese Patent No. 3,040,705 proposes a polymer particle containing smectite, and Japanese Unexamined Patent Publication No. Hei 10(1998)-265580 proposes a composite particle in which silica particles of 500 nm or less are dispersed in resin particles.

However, even a composition using one of the above particles as particles to be blended can not still provide a coated article or a molded article having sufficient light diffusibility.

Additionally, in addition to those described in the above publications, a composite particle in which a surface of a polymer particle is covered with other polymer or an inorganic material has been also known.

Among these, the latter composite particle in which the surface of the polymer particle is covered with the inorganic material has an advantage that a refractive index at an interface between the polymer particle and the inorganic material is made greater than a refractive index at an interface between the polymers of the former.

A composite particle in which a surface of polymer particle is covered with an inorganic material has been reported, for example, in Japanese Unexamined Patent Publication No. Hei 5(1993)-170924. This publication describes a composite particle in which a substance smaller than a particle of a thermoplastic substance and excellent in heat resistance is immobilized on the particle of a thermoplastic substance. The composite particle is obtained by a mechanical shear force by raising a temperature of the particle of the thermoplastic substance to a softening temperature or more, and stirring a substance excellent in heat resistance and the particle of the thermoplastic substance.

The composite particle obtained by the method of Japanese Unexamined Patent Publication No. Hei 5(1993)-170924 has a structure that the surface of the particle of the thermoplastic substance is approximately uniformly covered with the substance excellent in heat resistance, has slightly improved in light diffusibility and reflectivity rather than the particle of the thermoplastic substance as a raw material; however, further improvement is demanded.

In addition, in the above method, since a mechanical shear force is applied to the particle of the thermoplastic substance, it is required that the particles of the thermoplastic substance endure this shear force, and there is a problem that a usable substance is limited.

Furthermore, it is required that the particle of the thermoplastic substance is prepared in advance before subjected to the method, and further omission of a step is desired from a viewpoint of saving of a manufacturing cost.

DISCLOSURE OF THE INVENTION

In order to solve the aforementioned problems, the present inventor intensively studied and, as a result, have unexpectedly found that, by aqueous suspension-polymerizing a polymerizable vinyl-based monomer in the presence of a polyalkoxysiloxane oligomer having no copolymerizability with the polymerizable vinyl-based monomer and, then, condensing with the polyalkoxysiloxane oligomer, a silica film derived from the polyalkoxysiloxane oligomer can be formed so that a surface of a polymer particle is exposed, and the resulting polymer particle coated with silica is excellent in light diffusibility and reflectivity, which resulted in completion of this invention.

In addition, the present inventors have also found that the polymer particle coated with silica can impart excellent light diffusibility and reflectivity to a coated article or a molded article by blending in a coating composition or a molded article.

Thus, according to this invention, there is provided a polymer particle coated with silica comprising: a polymer particle derived from a polymerizable vinyl-based monomer; and a silica film covering the polymer particle, which makes a surface of the polymer particle expose so that an aperture ratio of 0.1 to 1 is possessed and a height h of the silica film and a diameter D of the polymer particle coated with silica have a relationship of $0.5 \leq h/D < 1$, wherein the silica film includes a polyalkoxysiloxane oligomer condensate.

According to this invention, there is also provided a coating composition comprising: a polymer particle coated with silica comprising a polymer particle derived from a polymerizable vinyl-based monomer, and a silica film covering the polymer particle, which makes a surface of the polymer particle expose so that an aperture ratio of 0.1 to 1 is possessed and a height h of the silica film and a diameter D of the polymer particle coated with silica have a relationship of $0.5 \leq h/D < 1$, the silica film including a polyalkoxysiloxane oligomer condensate; and a binder solution, wherein the binder solution contains a binder resin and a solvent.

In addition, according to this invention, there are also provided a coated article in which the aforementioned coating composition is coated on a substrate, an optical member in which the aforementioned coating composition is coated on a transparent substrate, and a liquid crystal display in which the optical member is used.

Furthermore, according to this invention, there is also provided a light diffusible molded article comprising a transparent resin and a polymer particle coated with silica, wherein the polymer particle coated with silica comprises a polymer particle derived from a polymerizable vinyl-based monomer, and a silica film covering the polymer particle, which makes a surface of the polymer particle expose so that an aperture ratio of 0.1 to 1 is possessed and a height h of the silica film and a diameter D of the polymer particle coated with silica have a relationship of $0.5 \leq h/D < 1$, and the silica film includes a polyalkoxysiloxane oligomer condensate.

Still further, according to this invention, there is also provided a method for producing a polymer particle coated with a silica film which makes a surface of the polymer particle expose so that an aperture ratio of 0.1 to 1 is possessed, and a height h of the silica film and a diameter D of the polymer particle coated with silica have a relationship of $0.5 \leq h/D < 1$, the method comprising, in the following order, the steps of: uniformly mixing 100 parts by weight of a polymerizable vinyl-based monomer, 10 to 500 parts by weight of a polyalkoxysiloxane oligomer which is inert to the polymerizable vinyl-based monomer, and 0.01 to 10 parts by weight of a polymerization initiator to obtain a monomer composition; aqueous suspension-polymerizing the polymerizable vinyl-based monomer in the monomer composition in the presence of a suspension stabilizer to obtain a polymer particle; and adding an acid or base catalyst to condense the polyalkoxysiloxane oligomer.

BRIEF DESCRIPTION OF THE DRAWINGS

FIG. 1 is a schematic cross-sectional view of a polymer particle coated with silica of this invention.

FIG. 2 is a schematic cross-sectional view of a silica particle obtained by firing the polymer particle coated with silica of this invention.

FIG. 3 is a conceptual view for illustrating a method of measuring an aperture ratio in this invention.

FIG. 4 is a schematic cross-sectional view showing a sheet-like light diffusible molded article containing the polymer particle coated with silica.

BEST MODE FOR CARRYING OUT THE INVENTION

The polymer particle coated with silica of this invention has a structure having anisotropy in which a surface of a spherical or approximately spherical polymer particle 1 is coated (covered) with a silica film 2 so that an aperture ratio is 0.1 to 1, as shown in a cross-sectional view of FIG. 1. In the figure, a reference number 3 means a polymer particle coated with silica. By having such the structure, as compared with a particle having no anisotropy such as a spherical silica particle, and a composite particle in which a surface of a polymer particle is completely coated with a silica film, complicated light reflection and refraction occur and, as a result, strong light diffusibility and reflectivity can be exhibited. When the aperture ratio of the silica film is less than 0.1, light diffusibility and reflectivity become poor and, when the aperture ratio exceeds 1, peeling of the film easily occurs, being not preferable. The aperture ratio is more preferably 0.1 to 0.8. The polymer particle coated with silica having an aperture ratio of 1 means that the silica film covers approximately a half of the particle.

A method of measuring an aperture ratio will be described in EXAMPLES to be described later. Herein, as an aperture ratio, the polymer particle coated with silica is fired to burn out the polymer particle to obtain a silica particle, and an aperture ratio of the silica particle is used. The aperture ratio of the silica particle has a value strictly different from the aperture ratio of the silica film in some cases, by shrinkage of the silica film at firing, or by lack of a thin region at an end of a silica covering, but the present inventor confirmed that the aperture ratio of the silica film of the polymer particle coated with silica is approximately consistent with the aperture ratio of the silica particle.

A height h of the silica film and a diameter D of the polymer particle coated with silica have a relationship of $0.5 \leq h/D < 1$. When h/D is 1, light diffusibility and reflectivity become poor, being not preferable. When h/D is less than 0.5, peeling of the film easily occurs, being not preferable.

A method of measuring h/D will be described in EXAMPLES. Herein, as h/D, the polymer particle coated with silica is fired to burn out the polymer particle to obtain the silica particle, and h/D of the silica particle is used. And, the h/D of the silica particle has a value strictly different from the h/D of the polymer particle coated with silica in some cases, by shrinkage of the silica film at firing, or by lack of the thin region at an end of the silica covering. However, the present inventors confirmed that the h/D of the polymer particle coated with silica is approximately consistent with the h/D of the silica particle.

The polymer particle coated with silica of this invention will be described below by referencing a method for producing the same.

First, the polymerizable vinyl-based monomer which can be used in this invention is not particularly limited. Examples thereof include styrene and a derivative thereof such as styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene, vinyl esters such as vinyl acetate, vinyl propionate, and vinyl butyrate, α-methylene aliphatic monocarboxylic acid esters such as methyl acrylate, ethyl acrylate, propyl acrylate, n-butyl acrylate, isobutyl acrylate, n-octyl acrylate, dodecyl acrylate, 2-ethylhexyl acrylate, stearyl acrylate, lauryl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, lauryl methacrylate, phenyl methacrylate, dimethylaminoethyl acrylate, dimethylaminoethyl methacrylate, diethylaminoethyl acrylate, and diethylaminoethyl methacrylate, and acrylic acid and methacrylic acid derivatives such as acrylonitrile, methacrylonitrile, acrylamide, methacrylamide, 2-hydroxyethyl acrylate, 2-hydroxypropyl acrylate, 2-hydroxyethyl methacrylate, and 2-hydroxypropyl methacrylate. Optionally, acrylic acid, methacrylic acid, maleic acid, and fumaric acid may be used. Furthermore, these may be used by combining two or more.

In addition, vinyl ethers such as vinyl methyl ether, vinyl ethyl ether, and vinyl isobutyl ether, vinyl ketones such as vinyl methyl ketone, vinyl hexyl ketone, and methyl isopropenyl ketone, N-vinyl compounds such as N-vinylpyrrole, N-vinylcarbazole, N-vinylindole, and N-vinylpyrrolidone, and vinyl naphthalene salt may be used alone or in combination of two or more in such a range that an effect of this invention is not prevented.

Among these, styrene and methyl methacrylate and the like which are inexpensive in a cost are preferable.

In addition, the polymer particle may be crosslinked with a monomer having two or more functional groups such as ethylene glycol dimethacrylate, polyethylene glycol dimethacrylate, and divinylbenzene.

In particular, when the polymer particle coated with silica is used in a system containing an organic solvent, it is preferable that the polymer particle is crosslinked. The amount of a preferable crosslinking agent (the aforementioned monomer having two or more function groups) to be added is preferably 1 to 50 parts by weight, particularly preferably 3 to 40 parts by weight, per 100 parts by weight of the polymerizable vinyl-based monomer (monomer having one functional group). When the addition amount is less than 1 part by weight, the resulting polymer particle is dissolved or swollen in the organic solvent in some cases, being not preferable.

In this invention, a polyalkoxysiloxane oligomer which is a precursor of the silica film is inert (means that it is not copolymerized) to the polymerizable vinyl-based monomer, and the oligomer having the following structural formula can be used.

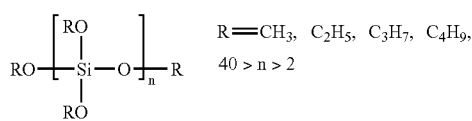

Among the aforementioned structural formula, examples include oligomers of polymethoxysiloxane, polyethoxysiloxane, polypropoxysiloxane, and polybutoxysiloxane. Among these, the polymethoxysiloxane oligomer, and the polybutoxysiloxane oligomer which are hardly water-soluble and are better in phase separation with a resin are preferable. Particularly preferable are the polymethoxysiloxane oligomer and the polybutoxysiloxane oligomer having a weight-average molecular weight of 300 to 3000, more preferably 300 to 2000. When the weight-average molecular weight is less than 300, or exceeds 3000, it becomes difficult to form the silica film in both, cases, being not preferable.

The weight-average molecular weight is measured using GPC under the following conditions:
Column: "TSK GEL" (made by Tosoh Corp.)
G-1000H
G-2000H
G-4000H
Eluent: tetrahydrofuran
Eluting rate: 1 ml/min
Eluting temperature: 40° C.

In low-molecular alkoxysiloxane in which n is 1 to 2 in the aforementioned molecular formula, such as tetramethoxysilane and tetraethoxysilane, since water-solubility becomes strong by hydrolysis of a functional group, it becomes difficult to be stably present in a monomer droplet, being not preferable. In addition, the polyalkoxysiloxane oligomer in which n is 40 or more in the aforementioned molecular formula is not preferable because compatibility with the polymerizable vinyl-based monomer or condensability of itself is reduced.

The amount of the polyalkoxysiloxane oligomer to be added is preferably 10 to 500 parts by weight, further preferably 20 to 300 parts by weight, per 100 parts by weight of the polymerizable vinyl-based monomer. When the amount is less than 10 parts by weight, it is difficult to realize the covering state in this invention, being not preferable. When the amount is more than 500 parts by weight, it is not preferable that the state of exposure of the polymer particle is realized with difficulty.

In addition, for the purpose of imparting function of ultraviolet-ray absorption to these polyalkoxysiloxane oligomers, a hydrolysable alkoxy metal compound other than a silicon series may be added.

For polymerizing the polymerizable vinyl-based monomer, a polymerization initiator is used. Examples of the polymerization initiator include oil-soluble peroxide series polymerization initiator and azo series initiator which are usually used in aqueous suspension polymerization. Specific examples include peroxide series polymerization initiators such as benzoyl peroxide, lauroyl peroxide, octanoyl peroxide, benzoyl orthochloroperoxide, benzoyl orthomethoxyperoxide, methyl ethyl ketone peroxide, diisopropyl peroxydicarbonate, cumene hydroperoxide, cyclohexanone peroxide, t-butyl hydroperoxide, and diisopropylbenzene hydroperoxide, and azo series initiators such as 2,2'-azobisisobutyronitrile,
2,2'-azobis(2,4-dimethylvaleronitrile),
2,2'-azobis(2,3-dimethylbutyronitrile), 2,2'-azobis(2-methylbutyronitrile),
2,2'-azobis(2,3,3-trimethylbutyronitrile),
2,2'-azobis(2-isopropylbutyronitrile),
1,1'-azobis(cyclohexan-1-carbonitrile),
2,2'-azobis(4-methoxy-2,4-dimethylvaleronitrile,
(2-carbamoylazo)isobutyronitrile, 4,4'-azobis(4-cyanovaleric acid), and
dimethyl-2,2'-azobisisobutyrate.

Among these, 2,2'-azobisisobutyronitrile, 2,2'-azobis(2,4-dimethylvaleronitrile), benzoyl peroxide, lauroyl peroxide and the like are preferable in terms of a degradation rate of the polymerization initiator. The polymerization initiator is used at preferably, 0.01 to 10 parts by weight, more preferably 0.1 to 5.0 parts by weight, per 100 parts by weight of the polymerizable vinyl-based monomer. When the polymerization initiator is less than 0.15 parts by weight, it is difficult to exert function of polymerization initiation. On the other hand, when the polymerization initiator is used at an amount exceeding 10 parts by weight, this is not economical from a viewpoint of a cost.

In order to color the silica film, a metal oxide pigment such as titanium oxide, zinc oxide, magnesium oxide, chromium oxide, and zirconium oxide may be used. However, an organic pigment, a metal hydroxide pigment, a dye and the like are not preferable since a structure thereof is changed at sintering or burning.

The polymerizable vinyl-based monomer, the polyalkoxysiloxane oligomer, the polymerization initiator and other component are uniformly mixed by the well-known method to obtain a monomer composition.

Then, examples of an aqueous medium for aqueous suspension-polymerizing the monomer composition include water, a mixed medium of water and a water-soluble solvent such as an alcohol. The amount of the aqueous medium to be used is usually 100 to 1000 parts by weight per a total 100 parts by weight of the polymerizable vinyl-based monomer and the polyalkoxysiloxane oligomer in order to stabilize a suspension polymerization particle.

In addition, in order to suppress generation of an emulsified particle in an aqueous system, a water-soluble polymerization inhibitor such as nitrites, sulfites, hydroquinones, ascorbic acids, water-soluble vitamin Bs, citric acid, and polyphenols may be used.

Furthermore, if necessary, a suspension stabilizer may be added to the aqueous medium. Examples thereof include phosphate such as calcium phosphate, magnesium phosphate, aluminum phosphate, and zinc phosphate, pyrophosphate such as calcium pyrophosphate, magnesium pyrophosphate, aluminum pyrophosphate, and zinc pyrophosphate, and a dispersion stabilizer of a hardly water-soluble inorganic compound such as calcium carbonate, magnesium carbonate, calcium hydroxide, magnesium hydroxide, aluminum hydroxide, calcium metasilicate, calcium sulfate, barium sulfate, and colloidal silica. Among these, tri calcium phosphate, magnesium pyrophosphate and calcium pyrophosphate obtained by a double decomposition production method, and colloidal silica are preferable since the polymer particle can be stably obtained.

In addition, it is also possible to use a surfactant such as anionic surfactant, cationic surfactant, amphoteric surfactant, and nonionic surfactant together with the aforementioned suspension stabilizer.

Examples of the anionic surfactant include a fatty acid oil such as sodium oleate, and potassium castor oil, an alkyl sulfate ester salt such as sodium laurylsulfate, and ammonium laurylsulfate, an alkylbenzene sulfonate salt such as sodium dodecylbenzenesulfonate, an alkylnaphthalenesulfonate salt, an alkanesulfonate salt, a dialkylsulfosuccinate salt, an alkyl phosphate ester salt, a naphthalenesulfonic acid formalin condensate, and a polyoxyethylene alkyl phenyl ether sulfate ester salt, a polyoxyethylene alkylsulfate ester salt and the like.

Examples of the nonionic surfactant include polyoxyethylene alkyl ether, polyoxyethylene alkyl phenyl ether, polyoxyethylene fatty acid ester, sorbitan fatty acid ester, polyoxysorbitan fatty acid ester, polyoxyethylene alkylamine, glycerin fatty acid ester, oxyethylene-oxypropylene blocked polymer and the like.

Examples of the cationic surfactant include alkylamine salt such as laurylamine acetate, and stearylamine acetate, and quaternary ammonium salt such as lauryltrimethylammonium chloride, and the like.

Examples of the amphoteric surfactant include lauryldimethylamine oxide, and phosphate ester series or phosphite ester series surfactant, and the like.

These suspension stabilizers and surfactants may be used alone, or in combination of two or more, and they are used by appropriately adjusting selection and the use amount of the suspension stabilizer in view of a particle diameter of the resulting polymer particle and dispersion stability at polymerization. Usually, the amount of the suspension stabilizer to be used is 0.5 to 15 parts by weight per 100 parts by weight of the polymerizable vinyl-based monomer, and the amount of the surfactant to be added is 0.001 to 0.1 parts by weight per 100 parts by weight of the aqueous medium.

The monomer composition is added to the thus adjusted aqueous medium, and aqueous suspension polymerization is performed.

Examples of a method of dispersing the monomer composition include a method of directly adding the monomer composition to the aqueous medium, and dispersing as a monomer droplet in the aqueous medium by a stirring force of a propeller, and a method of dispersing using a homomixer which is a dispersing machine configured by a rotor and a stator utilizing a high shear force, or an ultrasound dispersing machine, and the like. Among these, when the monomer composition is dispersed with a high pressure-type dispersing machine utilizing collision between monomer droplets or an impact force against a machine wall, such as a microfluidizer, and a nanomizer, or by a method of pressing a monomer composition into an aqueous medium through a MPG (Micro Porous Glass) porous membrane, it is preferable that a particle diameter is more uniformized.

Then, by heating the aqueous medium in which a monomer composition as a spherical monomer droplet is dispersed, suspension polymerization is initiated. During a polymerization reaction, it is preferable to stir the aqueous medium, and stirring may be mildly performed to such an extent that floating of a monomer droplet or settlement of particles after polymerization can be prevented.

In suspension polymerization, the polymerization temperature is preferably about 30 to 100° C., more preferably about 40 to 80° C. The time during which this polymerization temperature is retained is preferably about 0.1 to 20 hours.

When the boiling point of the polymerizable vinyl-based monomer or the polyalkoxysiloxane oligomer is around a polymerization temperature or not lower than a polymerization temperature, it is preferable that polymerization is performed under sealing or under pressure by using a pressure resistant polymerization facility such as an autoclave so that the polymerizable vinyl-based monomer and the polyalkoxysiloxane oligomer are not volatilized.

Then, by condensing the polyalkoxysiloxane oligomer, the polymer particle coated with silica of this invention can be obtained. Examples of the method of condensing the polyalkoxysiloxane oligomer include dehydration condensation using an acid catalyst or a base catalyst. As the acid catalyst and the base catalyst, hydrochloric acid, sulfuric acid, nitric acid, ammonia, sodium hydroxide, potassium hydroxide, and ammonium nitrate can be used. When a manufacturing container is made of a steel or a stainless steel, sodium hydroxide and ammonia which are basic are preferable from a viewpoint of corrosion. The amount of the catalyst to be added is preferably 0.01 to 30 parts by weight, more preferably 1 to 15 parts by weight, per 100 parts by weight of the polyalkoxysiloxane oligomer.

After condensation, if necessary, the suspension stabilizer is degraded with hydrochloric acid, the polymer particle coated with silica is separated as a hydrous cake by a method such as suction filtration, centrifugation dehydration, centrifugation, pressure dehydration and, further, the resulting hydrous cake is washed with water, and dried, thereby, an objective polymer particle coated with silica can be obtained.

As described above, since the method of this invention is not a method of applying a high shear force to cover the polymer particle with the silica particle, even low heat resistant polymer particle having Tg (glass transition point) of less than 80° C. can be easily coated. Examples of a polymer having Tg of lower than 80° C. include polyethyl acrylate, poly n-butyl acrylate, polyisobutyl acrylate, polylauryl acrylate, polystearyl acrylate, poly 2-ethylhexyl acrylate, polyethyl methacrylate, poly n-butyl methacrylate, polyisobutyl methacrylate, polylauryl methacrylate, polystearyl methacrylate, poly 2-ethylhexyl methacrylate and the like.

A size and a shape of the polymer particle coated with silica of this invention are not particularly limited. According to the aforementioned method for producing the polymer particle coated with silica, the particle having the volume-average particle diameter of 1 to 100 μm can be obtained.

Herein, adjustment of the volume-average particle diameter of the particle can be performed by adjusting condition for mixing the monomer composition and water, the addition amount of the suspension stabilizer or the surfactant, stirring condition for the stirrer, or dispersing condition.

The polymer particle coated with silica, composite particle, of this invention contains a silica film at preferably 10 to 500 parts by weight, more preferably 20 to 300 parts by weight, per 100 parts by weight of the polymer particle.

According to this invention, the polymer particle coated with silica having a specular reflectance (definition is described in EXAMPLES) of 3 to 13% can be provided. This value is a value lower than about 14% when the polymer particle is completely coated with the silica film, indicating that the polymer particle coated with silica of this invention is excellent in light diffusibility and reflectivity. When a specular reflectance is 5 to 13%, light diffusibility and reflectivity are particularly excellent.

In addition, a coating composition of this invention has a composition in that the aforementioned polymer particle coated with silica is blended in a binder solution containing a binder resin and a solvent. Since the coating composition of this invention is characterized in that the silica-film is provided so that a surface of the polymer particle is exposed although its action is not clear, compatibility between, and dispersion stability of the polymer particle coated with silica and the binder resin are excellent. In addition, in the polymer particle coated with silica, complicated light reflection and refraction occur and, as a result, it is thought that more excellent light diffusibility is exhibited.

Furthermore, a coated article is excellent in dispersion stability of the particle and, moreover, excellent in light diffusibility can be obtained using the coating composition of this invention.

The polymer particle coated with silica used in the coating composition has a volume-average particle diameter of usually 1 to 100 μm, preferably 3 to 50 μm, further preferably 3 to 30 μm. A method of measuring the volume-average particle diameter is described in EXAMPLES.

When the volume-average particle diameter of the polymer particle coated with silica is less than 1 μm, there is a possibility that sufficient light reflectivity is not obtained, being not preferable. When the diameter exceeds 100 μm, there is a possibility that appearance of a coated article is deteriorated, being not preferable.

As the binder resin constituting the binder solution, usually, a thermoplastic resin is used, and examples of the thermoplastic resin include (meth)acrylic resin, alkyl (meth) acrylate-styrene copolymer resin, polycarbonate resin, polyester resin, polyethylene resin, polypropylene resin, polystyrene resin, silicone resin, urethane resin, epoxy resin, melamine resin, vinyl acetate resin, phenol resin, resorcin resin, butadiene acrylonitrile rubber and the like.

Among these, when excellent transparency is required in a member after coating, such as the coating composition for an optical member, (meth)acrylic resin, alkyl (meth)acrylate-styrene copolymer resin, polycarbonate resin, and polyester resin are preferable. These thermoplastic resins can be used alone, or in a combination of two or more.

The solvent constituting the binder solution is not particularly limited as far as solubility or dispersibility of the binder resin is not problematic, and examples include one or two or more kinds of hydrocarbon solvents such as n-butane, n-hexane, n-heptane, n-octane, isononane, n-decane, n-dodecane, cyclopentane, cyclohexane, and cyclobutane, ketone solvents such as acetone, methyl ethyl ketone, methyl isobutyl ketone, cyclohexanone, and isophorone, ester solvents such as ethyl acetate, and butyl acetate, ether alcohol solvents such as ethylene glycol monomethyl ether acetate, ethylene glycol monoethyl ether, ethylene glycol monobutyl ether, and diethylene glycol monoethyl ether, alcohol solvents such as ethanol, isopropanol, n-butanol, and isobutanol, aromatic solvents such as toluene, xylene, and catechol, water and the like.

In an aqueous binder solution using the solvent of water or an alcohol series, it is not necessary that the binder resin is not completely dissolved in the solvent, but may be dispersed in a form of an emulsion or a dispersion.

Among the aforementioned exemplification, examples of the particularly preferably solvent include methyl ethyl ketone, cyclohexanone, ethyl acetate, butyl acetate, and toluene in view of solubility of the binder resin, and a drying rate after coating. In addition, as the aqueous emulsion or dispersion, an emulsion or a dispersion of an acryl series or a polyester series is easily available, and transparency of a resin is high, being preferable.

In the coating composition of this invention, the amount of the polymer particle coated with silica to be blended is usually 1 to 150 parts by weight, preferably 1 to 120 parts by weight, per 100 parts by weight of a binder resin.

When the amount is 1 part by weight or more, more sufficient light diffusibility and light reflectivity are obtained. When the amount is 150 parts by weight or less, there is no possibility that dispersion stability of the composite particle and adherablity to the adhered such as a substrate are reduced.

In the case of a diffusion sheet for diffusing transmitted light composed of a transparent substrate and a coated article, the amount of the polymer particle coated with silica in the coating composition to, be blended is preferably 20 to 120 parts by weight, more preferably 20 to 100 parts by weight, per 100 parts by weight of the binder resin. In the case of an antiglare sheet for diffusing reflected light, the amount is preferably 1 to 30 parts by weight, more preferably 5 to 30 parts by weight.

In addition, the amount of the solvent to be blended is not particularly limited as far as it is such the amount that the binder resin can be sufficiently uniformly dissolved or dispersed and the silica-coated polymer particle can be sufficiently uniformly dispersed, but is preferably 100 to 1000 parts by weight per 100 parts by weight of the binder resin. When the amount is less than 100 parts by weight, there is a possibility that the binder resin is not sufficiently uniformly dissolved or dispersed, being not preferable. When the amount exceeds 1000 parts by weight, since a viscosity of the coating composition is remarkably decreased, it is not preferable to becomes difficult to prepare a uniform coated article (coated film).

In the coating composition in this invention, in order to impart function of duster, opaqueness, or color to a coated article, inorganic pigments such as titanium oxide, zinc oxide, zirconium oxide, magnesium oxide, iron oxide, iron hydroxide, chromium oxide, chromium hydroxide, ultramarine, Prussion blue, manganese violet, ultramarine purple, titanium black, carbon black, aluminum powder, mica titanium, bismuth oxychloride, iron oxide-treated mica titanium, Prussion blue-treated mica titanium, carmine-treated mica titanium, silica, calcium carbonate, magnesium carbonate, barium sulfate, barium silicate, calcium silicate, magnesium silicate, calcium phosphate, hydroxyapatite, zeolite, alumina, talc, mica, bentonite, kaolin, and sericite, or organic pigments such as aluminum lake such as Tartrazine, Sunset Yellow FCF, brilliant blue FCF, zirconium lake, barium lake, Helindone Pink CN, Lithol Rubine BCA, lake red CBA, phthalocyanine blue, and permanent orange may be blended.

The amount of the pigment to be blended is preferably 1 to 80 parts by weight per 100 parts by weight of the binder resin. When the amount is less than 1 part by weight, an effect of the pigment such as coloring is not obtained. When the amount exceeds 80 parts by weight, a coated article having high appearance is not obtained. However, it is preferable that a pigment is not blended in the coating composition for the optical member.

In addition, the resin particle (particle of polymer alone) or the inorganic particle (particle of inorganic substance alone) may be blended in the coating composition of this invention in such the range that the effect of this invention is not deteriorated.

Then, the coated article in which the coating composition is coated on various substrates will be described.

The coated article of this invention is characterized in that the aforementioned coating composition is coated on various substrates. In addition, the optical member is characterized in that the aforementioned coating composition is coated on various transparent substrates.

Examples of the substrate include metals (iron, aluminum, zinc and the like), timbers, plastics, glasses, slates, mortars, stone materials, concretes and the like. Specific examples include members constituting automobiles or home electrical appliances, transparent members such as light guide plates, and substrates constituting construction materials, miscellaneous goods, papers, and construction wall materials, and the like.

As the transparent substrate, substrates made of glasses or plastics are preferable, and examples include substrates made of quartz glass, soda glass, polycarbonate, polymethyl methacrylate, polyvinyl chloride, polyester, cellulose acetate butyrate, polyolefin, polystyrene, fluorine resin, epoxy resin, polyacrylate, silicone, polyethylene terephthalate, cycloolefin polymer, polyimide and the like.

It is preferable that these substrates have heat resistance, curling resistance, solvent resistance and the like.

The shape of the substrate, in particular, the transparent substrate is preferably sheet-like. It is usually preferable that the sheet-like substrate has a thickness of about 10 to 3000 µm. The transparent substrate constituting an optical sheet as the optical member has preferably a thickness of 10 to 300 µm.

As a method of coating the coating composition on the substrate, in particular, the transparent substrate, the known coating method can be selected. For example, coating methods such reverse roll coating method, die coating method, comma coater method, spray coating method, gravure coating method, rod coating method, and brush coating, roller coating, spray coating, cation electrocoating, electrostatic coating and the like can be adopted.

The thickness of the coated article is preferably 1 to 500 µm, more preferably 1 to 200 µm, in the dry state where the solvent has been completely volatilized. In particular, in the optical sheet, the thickness of 1 to 100 µm is preferable.

In the optical sheet as the optical member of this invention, the coating composition may be coated on one side of the sheet-like transparent substrate, or may be coated on both sides. In addition, a plurality of layers may be formed, each layer being the coated article on which the coating composition is coated. Furthermore, a hard coated layer may be laminated on a surface of the coated article for the purpose of preventing a flaw or improving weather resistance.

In addition, the light diffusible molded article of this invention contains a transparent resin and the aforementioned polymer particle coated with silica. For this reason, the light diffusible molded article which is excellent in light diffusibility and in which reduction in a total light transmittance is small can be obtained as compared with the case where the inorganic particle or the resin particle such as polyacrylate resin and polystyrene resin is used. Further, compatibility between the polymer particle coated with silica and a transparent resin is better, and more sufficient transparency can be maintained. In addition, as compared with the case where the composite particle in which a surface of the polymer particle is completely coated with the silica film is used, complicated light reflection and refraction occur, and more excellent light diffusibility can be manifested. In addition, a diffused light transmittance can be 80% or more. Therefore, for example, in a liquid crystal display using the light diffusible molded article of this invention, since loss of light from a backlight can be decreased, consumed electric power can be suppressed.

Herein, the term "transparent" includes "semi-transparent". Further, "transparent" is not necessarily required to be transparent to light in all wavelength, but is enough that light of at least a particular wavelength can be transmitted. Light includes not only visible light but also ultraviolet light and infrared light.

In this invention, the amount of the aforementioned polymer particle coated with silica to be blended is preferably 0.1 to 20 parts by weight per 100 parts by weight of the aforementioned transparent resin (100 parts by weight of the resin component except for various additives such as ultraviolet absorbing agent).

When the amount is in this range, the light diffusible molded article which is excellent in light diffusibility, and has small reduction in a total light transmittance and, moreover, has a diffused light transmittance of 80% or more, can be more assuredly obtained. As described above, the light diffusible molded article of this invention has an advantage that light diffusibility is excellent, and reduction in a total light transmittance is small and, moreover, a transmittance of diffused light is high.

Then, a preferable embodiment of the light diffusible molded article of this invention will be described with reference to the drawings.

The light diffusible molded article of this invention is characterized in that polymer particles coated with silica 3 of FIG. 1 are blended in the transparent resin 4 as exemplified in FIG. 4, and it is preferable that a value of a diffused light transmittance represented by, diffused light transmittance (%)=total light transmittance (%)×haze (%)×0.01, (equation)

is 80% or more.

In the light diffusible molded article of this invention, a ratio of the polymer particle coated with silica to be blended is usually 0.1 to 20 parts by weight, preferably 0.3 to 15 parts by weight, further preferably 1 to 15 parts by weight, per 100 parts by weight of the transparent resin. When the blending ratio is more than 30 parts by weight, it becomes difficult to prepare the light diffusible molded article, being not preferable. On the other hand, when the blending ratio is lower than 0.1 parts by weight, it becomes difficult to adjust a diffused light transmittance to 80% or more, being not preferable.

In this invention, as the transparent resin, a thermoplastic resin is usually used, and examples of the thermoplastic resin include (meth)acrylic resin, alkyl (meth)acrylate-styrene copolymer resin, polycarbonate resin, polyester resin, polystyrene resin, polypropylene resin, polystyrene resin and the like.

Among these, when excellent transparency is required, (meth)acrylic resin, alkyl (meth)acrylate-styrene copolymer resin, polycarbonate resin, and polyester resin are preferable. These thermoplastic resins can be used alone, or may be used by combining two or more.

As the polymer particle coated with silica, a particle having a difference in a refractive index from the transparent resin in a range of preferably 0.01 to 0.1, more preferably 0.02 to 0.1, is used.

When the difference in a refractive index is less than 0.01, a sufficient haze is not obtained, and it is not preferable that the diffused light transmittance is less than 80%. On the other hand, when the difference in a refractive index is more than 0.1, light diffusing property of the molded article becomes too high, and it is not preferable that a total light transmittance is remarkably reduced.

The minor amount of an additive such as ultraviolet absorbing agent, heat stabilizer, coloring agent, filler or the like may be added to the transparent resin.

In the light diffusible molded article of this invention, the size and the shape of the polymer particle coated with silica are not particularly limited. When the light diffusible molded article is used as a signboard or a container, the volume-average particle diameter is preferably 3 to 50 µm. When the light diffusible molded article is used in the optical component, in particular, the optical component for which precision such as precise image display is required in a liquid crystal display or a projection television, the volume-average particle diameter is preferably 3 to 30 µm.

When the diameter is 3 to 50 µm, more uniform diffused light and a high total light transmittance are obtained and, in the field in which a highly precise image such as a display is required, a precise image is obtained in the case of smaller particles of 3 to 30 µm.

In addition to the aforementioned polymer particle coated with silica, a resin particle (particle of resin alone) or an inorganic particle may be blended in the light diffusing molded particle of this invention in such the range that the effect of this invention is not deteriorated.

The light diffusing molded particle of this invention is usually obtained by mixing the polymer particle coated with silica and the transparent resin, melting and kneading them, and molding the mixture by a molding method such as extrusion molding and injection molding.

EXAMPLES

Then, this invention will be described in more detail below by way of examples, but this invention is not limited by these descriptions.

First, in the examples of this invention, a volume-average particle diameter, Tg, a specular reflectance, an aperture ratio, h/D, re-dispersibility, a haze, a total light transmittance, a diffused light transmittance, and a refractive index were measured by the following methods.

(Method of Measuring Volume-Average Particle Diameter)

The particle diameter was measured by a coulter counter method.

The coulter counter method is a method of measuring the particle diameter by an electric resistance method called coulter principle.

More particularly, this method is a method in which electrodes are placed on both sides of an aperture (fine pore) of an aperture tube in an electrolyte solution, a current is passed between both electrodes, a particle to be measured is suspended in an electrolyte solution, the electrolyte solution is sucked with a manometer from the interior of the aperture tube and, when the electrolyte solution is passed through the aperture, the electrolyte solution corresponding to the particle volume is replaced, a resistance is generated between both electrodes and, since a change amount in this resistance is proportionate to the volume of the particle passing through the aperture, this is detected and calculated to obtain the volume-average particle diameter of the particle diameter.

Specifically, according to "REFERENCE MANUAL FOR THE COULTER MULTISIZER" (1987), published by Coulter Electronics Limited, calibration was performed using an aperture having the diameter of 100 µm, and the volume-average particle diameter was measured. More specifically, 0.1 g of particles was pre-dispersed in 10 ml of a 0.1% nonionic surfactant solution using a touch mixer and an ultrasound employing, as a particle diameter measuring apparatus, an apparatus constructed of Coulter Multisizer II and Sampling Stand IIA (manufactured by Beckman Coulter Inc.), this was added to a beaker containing 300 ml of ISOTON II (measuring electrolyte solution, manufactured by Beckman Coulter Inc.) disposed on Sampling Stand II, with a dropper while mildly stirring, this was adjusted so that a densitometer on a body screen indicates about 10%, and the volume-average particle diameter of 100 thousands of particles was measured.

(Method of Measuring Tg)

Measurement of Tg was performed using TG/DTA6200 (manufactured by Seiko Instruments Inc.).

Measurement

About 0.02 g of a sample was weighed into an aluminum oven container (manufactured by Seiko Instruments Inc.), and this was set in an autosampler of TG/DTA6200. The temperature was raised at 5° C./min, and differential thermal analysis was performed at the temperature from room temperature (about 25° C.) to 400° C. under the air atmosphere.

Analysis

An inflexion point part of a graph derived from Tg of a polymer was found out from a graph (ordinate axis: temperature, abscissa axis: time) obtained by the aforementioned procedure, and the inflexion point was adopted as a Tg temperature. In the case of the absence of Tg, there is no inflexion point until degradation of a measurement subject begins, and the temperature is risen linearly.

(Method of Measuring Specular Reflectance)

Sample Preparation

A double-sided adhesive tape (NITTO TAPE: manufactured by Nitto Denko Corp.) was applied to a whole surface a white black covering paper (manufactured by BYK-Gardner GmBH) cut into 50 mm×100 mm, 1 g of particles were placed on an adhesive side, particles were spread evenly in a length direction and a traverse direction every 10 times using a cosmetic sponge, extra particles were fallen by blowing a compressed air at 1.5 kg/cm$^2$ to a whole surface for 30 seconds from a place at a distance of 20 cm from a sample, and the specular reflectance of a part in which a ground is black is measured.

Measurement

For measuring the specular reflectance, the specular reflectance with an incident light 60° relative to a particle-adhered surface was measured using VGS-300A and VGS-SENSOR (manufactured by Nippon Denshoku Industries Co., Ltd.) according to JIS Z8741. Measurement was performed five times, and the average value is adopted as the specular reflectance herein.

This specular reflectance means that as a value grows larger, light diffusibility and light reflectivity become poor and, as a value blows smaller, light diffusibility and light reflectivity are improved.

(Method of Confirming Polymer Particle Coated with Silica)

A method of confirming the polymer particle coated with silica is a method of adding dropwise one droplet of a dispersion of the polymer particle coated with silica in water on a slide glass, and observing the polymer particle coated with silica described in Examples with naked eyes using a microscope (lens used: magnification 600) with a light source of a sodium lamp.

(Method of Measuring Aperture Ratio)

In a method of measuring the aperture ratio, first, 1 g of the polymer particle coated with silica was weighed into a 50 ml of a porcelain crucible, this was fired at 500° C. for 2 hours using an electric furnace (manufactured by ISUZU), and particles composed of only a silica-part of the polymer particle coated with silica (hereinafter, referred to as silica particle) shown in FIG. 2 was obtained.

Then, this silica particle was calmly taken out from a porcelain crucible with a spater so as not to damage them, and a photograph was taken with a scanning electron microscope (GMS-820-A: manufactured by JEOL. Ltd.).

Further, among taken photographs, arbitrary 50 in which an opening part of the silica particle is present on an upper side were selected, a contour of the silica particle and a contour of an opening part of each photograph manually were designated by using trace measurement of an image analyzing device (Image-Ana LITE: manufactured by Omron Co., Ltd.), and a projected area (S2) of the silica particle and an area (S1) of an opening part were measured as exemplified in FIG. 3.

From each measured area, the aperture ratio of individual silica particles was obtained by the following equation, and the average value is shown in examples.

Aperture ratio=area of opening part of the silica particle (S1)/projected area of the silica particle (S2)

(Measurement of h/D of Silica Particle)

As shown in FIG. 2, letting the diameter of the silica particle to be D and a height of silica particle to be h, the value of h/D was measured by the following method.

According to the same manner as that of the method of measuring the aperture ratio, a scanning electron micrograph of the silica particle was taken, among taken photographs, arbitrary 50 particles in which a plane of an opening part of the silica particle was vertical relative to a photograph taking plane were selected. The value of D and the value of h of individual particles were measured with the image analyzing device, and h/D was calculated. Herein, h/D means the average of 50 h/Ds.

(Assessment of Re-dispersibility)

40 ml of a prepared coating composition was filled into a 50 ml sample tube with a lid, this was centrifuged at 3000 rpm for 10 minutes using a centrifuge to completely separate a liquid part and a solid part, a sample tube was set transversely in a rotary shaker (manufactured by Taiyo Scientific Industrial Co., Ltd.), and vibrated for 10 minutes under vibration condition of 60 times/min.

And, the state after vibration was confirmed with naked eyes, the absence of a mass of particles was assessed to be ◯, and remaining of a mass of particles was assessed to be X.

(Measurement of Total Light Transmittance, Haze, Specular Reflectance, Diffused Light Transmittance)

The total light transmittance and the haze of a coated article and a molded article were measured with a hazemeter ("NDH-2000" manufactured by Nippon Denshoku Industries Co., Ltd.; according to JIS K7105).

In addition, a specular reflectance at an incident light of 60° relative to a coated side of a coated article was measured using VGS-300A and VGS-SENSOR (manufactured by Nippon Denshoku Industries Co., Ltd.) according to JIS Z8741. Measurement was performed five times, and the average value was adopted as the specular reflectance herein.

Further, a diffused light transmittance is a ratio occupied by diffused light among the total light transmittance, and the diffused light transmittance was obtained by the equation represented by:

Diffused light transmittance (%)=total light transmittance (%)×haze (%)×0.01

(Method of Measuring Refractive Index)

1. Method of Measuring Refractive Index of Polymer Particle 0.001 g of the polymer particles was placed on a slide glass, and the particles were dispersed with 0.2 ml of a liquid organic compound having a refractive index which was arbitrarily selected from the publication "ATAGO Refractometer Databook" (published by ATAGO Co., Ltd.), to prepare a sample plate.

Then, each sample plate was set on an optical microscope, this was observed using a sodium lamp as a light source, and disappearance of a contour of particles at a temperature at which a refractive index of each liquid organic compound is known was confirmed, and a refractive index of a liquid organic compound used thereupon was adopted as a refractive index of particles.

The aforementioned publication describes, as a liquid organic compound and its refractive index, for example:

Furfurylamine (17° C.) . . . refractive index: 1.4900, and
p-diethylbenzene . . . refractive index: 1.4948, but as a refractive index, a refractive index obtained by rounding to four decimal places was adopted. When the temperature is not described as in p-diethylbenzene, the presence or the absence of a contour of particles was confirmed at 20° C.

In the following Preparation Examples, using a monomer composition which had been separately prepared as in each Preparation Example, each monomer was radical-polymerized to obtain the polymer particle, the polymer particles were taken out without condensing with a polysiloxane oligomer, and washed with toluene to completely wash out polysiloxane oligomer, which was used to measure a refractive index as described above.

2. Method of Measuring Refractive Index of Transparent Resin

A transparent resin was ground into particles (about 1 mg or less per one particle), and this was used to measure a refractive index as in the case of the aforementioned polymer particle.

(Examples and Comparative Examples of Polymer Particle Coated with Silica)

Example 1

A dispersing medium in which 5 g of magnesium pyrophosphate obtained by double decomposition as a suspension stabilizer was mixed with 200 g of water, was placed into a 500 ml separable flask, and 0.04 g of sodium laurylsulfate as a surfactant, and 0.02 g of sodium nitrite as a polymerization inhibitor were dissolved in the dispersing medium.

Separately, 70 g of methyl methacrylate as a monofunctional polymerizable vinyl-based monomer, 30 g of MKC silicate MS57 (manufactured by Mitsubishi Chemical Co., Ltd.: average molecular weight 1300 to 1500, R in the aforementioned structure is methyl, and an average of n is 15 to 18) as a polyalkoxysiloxane oligomer, and 0.25 g of 2,2'-azobis(2,4-dimethylvaleronitrile) as a polymerization initiator were uniformly dissolved to prepare a monomer composition.

This monomer composition was added to the above dispersing medium, and this was stirred with a homomixer (ULTRA TURRAX T-25, manufactured by IKA) at 8000 rpm for about 10 seconds to finely disperse the monomer composition. A stirring wing, a thermometer and a refluxing condenser were attached to a separable flask, the flask was replaced with nitrogen, and this was mounted in a constant temperature water bath (water bath) at 60° C. The interior of the separable flask was stirred continuously at a stirring rate of 200 rpm and, when a temperature of a dispersing medium with the monomer composition added thereto in the separable flask reached 60° C., suspension polymerization was performed for 10 hours to a polymerizable vinyl-based monomer, and 2 g of sodium hydroxide was added to condense the polyalkoxysiloxane oligomer.

Then, the separable flask was removed from the constant temperature water bath, the reaction solution in the separable flask was cooled to room temperature while stirring the interior of the separable flask, hydrochloric acid was added to adjust a pH of a slurry to about 2 to decompose a suspension stabilizer, and the polymer particles coated with silica in which a surface of a polymer particle was exposed were obtained. The resulting particles were suction-filtered with a Buchner funnel using a filter, washed with 1.2 L of ion-exchanged water to remove a suspension stabilizer, and dried to take out objective particle. The volume-average particle diameter of the resulting polymer particles coated with silica is 5.8 μm, and Tg of a polymer particle derived from the polymerizable vinyl-based monomer is 105° C. The specular reflectance, the aperture ratio, h/D and the refractive index of the particle are shown in Table 1.

Example 2

According to the same manner as that of Example 1 except that an amount of methyl methacrylate was changed to 30 g, an amount of MKC silicate MS57 was changed to 70 g, and an amount of 2,2'-azobis(2,4-dimethylvaleronitrile) was changed to 0.15 g, polymer particles coated with silica in which a surface of a polymer particle was exposed were obtained. The volume-average particle diameter of the resulting polymer particles coated with silica is 116.3 μm, and Tg of a polymer particle derived from the polymerizable vinyl-based monomer is 105° C. The specular reflectance, the aperture ratio, h/D and the refractive index of the particle are shown in Table 1.

Example 3

According to the same manner as that of Example 1 except that, as polyalkoxysiloxane oligomer, MKC silicate MS 51 (manufactured by Mitsubishi Chemical Co., Ltd.: average molecular weight of 500 to 700, R in the aforementioned structural formula is methyl, and an average of n is 5 to 10) was used, polymer particles coated with silica in which a surface of a polymer particle was exposed were obtained. The volume-average particle diameter of the resulting polymer particles coated with silica is 6.4 μm, and Tg of a polymer part derived from the polymerizable vinyl-based monomer is 105° C. The specular reflectance, the aperture ratio, h/D and the refractive index of the particle are shown in Table 1.

Example 4

According to the same manner as that of Example 1 except that, as polyalkoxysiloxane oligomer, MKC silicate MS 58B15 (manufactured by Mitsubishi Chemical Co., Ltd.: average molecular weight of 1600 to 1800, R in the aforementioned structural formula is butyl, and an average of n is 11 to 13) was used, polymer particles coated with silica in which a surface of a polymer particle was exposed were obtained. The volume-average particle diameter of the resulting polymer particles coated with silica is 17.1 μm, and Tg of a polymer part derived from the polymerizable vinyl-based monomer is 105° C. The specular reflectance, the aperture ratio, h/D and the refractive index of the particle are shown in Table 1.

Example 5

According to the same manner as that of Example 1 except that styrene was used as a polymerizable vinyl-based monomer, polymer particles coated with silica in which a surface of a polymer particle was exposed were obtained. The volume-average particle diameter of the resulting polymer particles coated with silica is 12.5 µm, and Tg of a polymer part derived from the polymerizable vinyl-based monomer is 84° C. The specular reflectance, the aperture ratio, h/D and the refractive index of the particle are shown in Table 1.

Example 6

According to the same manner as that of Example 1 except that n-butyl acrylate was used as a polymerizable vinyl-based monomer, polymer particles coated with silica in which a surface of a polymer particle was exposed were obtained. The volume-average particle diameter of the resulting polymer particles coated with silica is 19.5 µm, and Tg of a polymer part derived from the polymerizable vinyl-based monomer is −54° C. The specular reflectance, the aperture ratio, h/D and the refractive index of the particle are shown in Table 1.

Comparative Example 1

A dispersing medium in which 18 g of magnesium pyrophosphate obtained by a double decomposition method as a suspension stabilizer had been mixed into 900 g of water was placed into a 2-L stainless beaker, and 0.18 g of sodium laurylsulfate as a surfactant, and 0.1 g of sodium nitrite as a polymerization inhibitor were dissolved in the dispersing medium.

Separately, 270 g of methyl methacrylate as a monofunctional polymerizable vinyl-based monomer, 30 g of dimethacrylic acid ethylene glycol, and 0.3 g of azobisisobutyronitrile as a polymerization initiator were uniformly dissolved to prepare a monomer composition.

This monomer composition was added to the aforementioned dispersing medium, this was stirred with a homo-mixer (TK homomixer manufactured by Tokushu Kika Kogyo Co. Ltd.) at 4000 rpm for about 10 seconds to finely disperse the monomer-composition. The dispersing medium was placed into a polymerization machine equipped with a stirrer and a thermometer, and stirring was continued at 50° C. for 5 hours to complete suspension polymerization.

After cooling, hydrochloric acid was added to a suspension, the suspension stabilizer was degraded, and the polymer particle was isolated, washed with water, and dried under reduced pressure to obtain spherical polymer particles (volume-average particle diameter: 13.1 µm). Since the spherical polymer particle had a crosslinked structure, Tg was not confirmed until 260° C. at which degradation of the particle by heating began.

21 g of the spherical polymer particles and 9 g of Aerosil R972 (manufactured by Aerosil, volume-average particle diameter: 16 nm) were treated with a hybridizer (manufactured by Nara Kikai Kogyo Co., Ltd.) at 50° C. and 14000 rpm for 5 minutes to obtain composite particles having a surface coated with the silica particle (volume-average particle diameter: 13.6 µm). The specular reflectance and the refractive index of the particle are shown in Table 1.

Comparative Example 2

According to the same manner as that of Example 1 except that an amount of methyl methacrylate was changed to 97 g, and an amount of MKC silicate MS57 was changed to 3 g, and an amount of 2,2'-azobis (2,4-dimethylvaleronitrile) was changed to 0.45 g, polymer particles coated with silica in which a surface of a polymer particle was exposed were obtained. The volume-average particle diameter of the resulting polymer particles coated with silica is 15 µm, and Tg of a polymer part derived from a polymerizable vinyl-based monomer is 105° C. Since the resulting particle had a small region coated with silica, a silica film was peeled in some cases. The specular reflectance, the aperture ratio, h/D and the refractive index of the particles are shown in Table 1.

Example 7

According to the same manner as that of Example 1 except that a polymerizable vinyl-based monomer was changed to 56 g of methyl methacrylate and 14 g of ethylene glycol dimethacrylate, polymer particles coated with silica in which a surface of a polymer particle was exposed were obtained. The volume-average particle diameter of the resulting polymer particles coated with silica is 15 µm, and Tg of a polymer part derived from a polymerizable vinyl-based monomer could not be confirmed until 260° C. at which the particle began to be degraded by heating because that part had a crosslinked structure. The specular reflectance, the aperture ratio, h/D and the refractive index of the particles are shown in Table 1.

Example 8

According to the same manner as that of Example 7 except that methyl methacrylate was changed to styrene, and ethylene glycol dimethacrylate was changed to divinylbenzene, polymer particles coated with silica in which a surface of a polymer particle was exposed were obtained. The volume-average particle diameter of the polymer particles coated with silica is 6 µm, and Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Example 9

According to the same manner as that of Example 7 except that MKC silicate MS 58 B15 (manufactured by Mitsubishi Chemical Co., Ltd., average molecular weight of 1600 to 1800) was used as a polyalkoxysiloxane oligomer, and stirring condition with a homomixer was at 10000 rpm for about 10 seconds, polymer particles coated with silica in which a surface of a polymer particle was exposed were obtained. The volume-average particle diameter of the polymer particles coated with silica is 5 µm, and Tg of a polymer part derived from a polymerizable vinyl-based monomer could not be confirmed until 260° C. at which the particle began to be degraded by heating because that part had a crosslinked structure. The specular reflectance, the aperture ratio, h/D and the refractive index of the particle are shown in Table 1.

Example 10

According to the same manner as that of Example 7 except that an amount of magnesium pyrophosphate was 7.5 g, and an amount of sodium laurylsulfate as a surfactant was 0.06 g, and stirring condition with a homomixer was at 10000 rpm for 60 seconds, polymer particles coated with silica in which a surface of a polymer particle was exposed were obtained. The volume-average particle diameter of the polymer particles coated with silica is 3 µm, and Tg of a polymer part derived from a polymerizable vinyl-based monomer could not be confirmed until 260° C. at which particles began to be degraded by heating because that part had a cross-linked structure. The specular reflectance, the aperture ratio, h/D and the refractive index of the particle are shown in Table 1.

Example 11

According to the same manner as that of Example 7 except that 56 g of styrene was changed to 28 g of styrene and 28 g of methyl methacrylate, polymer particles coated with silica in which a surface of a polymer particle was exposed were obtained. The volume-average particle diameter of the polymer particles coated with silica is 6 µm, and Tg of a polymer part derived from a polymerizable vinyl-based monomer could not be confirmed until 260° C. at which the particle began to be degraded by heating because that part had a crosslinked structure. The specular reflectance, the aperture ratio, h/D and the refractive index of the particle are shown in Table 1.

Comparative Example 3

500 g of deionized water in which 0.05 g of sodium laurylsulfate had been dissolved was placed into a polymerization vessel equipped with a stirrer and a thermometer, and 50 g of calcium tertiary phosphate was added to be dispersed. Into the dispersion was placed a mixed solution in which 0.5 g of benzoyl peroxide and 0.5 g of azobisisobutyronitrile were dissolved in 85 g of styrene and 15 g of divinylbenzene which are a polymerizable vinyl monomer, and the materials were dispersed with a T.K homomixer (manufactured by Tokushu Kika Kogyo Co., Ltd.) to adjust droplets to about 6 µm. Then, the interior of a polymerization vessel was heated to 65° C. to perform suspension polymerization while stirring, followed by cooling. The suspension was filtered, washed and dried to obtain spherical polymer particles. The volume-average particle diameter of the resulting polymer particles is 6 µm, and Tg of a polymer particle derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Comparative Example 4

According to the same manner as that of Comparative Example 3 except that styrene was changed to methyl metahcrylate, divinylbenzene was changed to ethylene glycol dimethacrylate, and a particle diameter of droplets was changed to about 15 µm, spherical polymer particles were obtained. The volume-average particle diameter of the polymer particles is 15 µm and Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Comparative Example 5

(Preparation of Solution of Polymer in Toluene)

144.5 g of tetramethoxysilane, 23.6 g of γ-methacryloxypropyltrimethoxysilane, 19 g of water, 30 g of methanol and 5 g of Amberlist 15 (cation exchange resin manufactured by Rohm and Haas Japan) were charged into a 300 ml four-neck flask equipped with a stirrer, a thermometer and a condenser, and the materials were stirred at 65° C. for 2 hours to react them. The reaction mixture was cooled to room temperature, a distillation tower was attached in place of a condenser, this was provided with a condenser and an efflux port, a temperature was raised to 80° C. for 2 hours under the atmospheric pressure, and a temperature was retained at the same temperature until methanol did not come out, to further proceed the reaction. After cooled to room temperature again, Amberlist 15 was filtered to obtain polymerizable polysiloxane having the number average molecular weight of 1800.

Then, 200 g of toluene as an organic solvent was placed into a 1 liter flask equipped with a stirrer, an addition port, a thermometer, a condenser and a nitrogen gas introducing port, a nitrogen gas was introduced, and the flask was heated to an internal temperature of 110° C. while stirring. Then, a solution obtained by mixing 20 g of the polymerizable polysiloxane obtained as described above, 80 g of methyl methacrylate, 10 g of 2-ethylhexyl acrylate, 60 g of styrene, 30 g of butyl acrylate and 6 g of 2,2'-azobisisobutyronitrile was added dropwise through the addition port over 2 hours. After addition, stirring was continued at the same temperature for 1 hour, 0.4 g of 1,1'-bis(t-butylperoxy)-3,3,5-trimethylcyclohexane was added two times every 30 minutes, and the materials were heated for 2 hours to perform copolymerization, to obtain a solution of a polymer in toluene in which a polymer having the number average molecular weight of 12000 was dissolved in toluene. A solid matter in the resulting solution was 49.5% by weight.

(Preparation of Dispersion)

496 g of butyl acetate and 124 g of methanol were placed into a 1 liter four-neck flask equipped with a stirrer, two addition ports (addition ports 1 and 2) and a thermometer, and an internal temperature was adjusted to 20° C. Then, a mixed solution (solution A) of 10 g of the above-obtained solution of the polymer in toluene and 100 g of tetramethoxysilane, and a mixed solution (solution B) of 30 g of water, 30 g of 25% aqueous ammonia and 60 g of methanol were added dropwise through the addition port 1 and the addition port 2, respectively, over 1 hour while stirring the interior of the flask. After addition, stirring was continued for 2 hours at the same temperature. Then, a mixed solution of 37 g of the solution of the polymer in toluene obtained as described above and 37 g of butyl acetate was added dropwise through the addition port 1 over 1 hour. After addition, stirring was continued at the same temperature for 2 hours. Further, an interior temperature of the flask was raised to 100° C. under a pressure of 110 mmHg, and ammonia, methanol, toluene and butyl acetate were distilled off until a solid matter concentration became 30% by weight, to obtain a dispersion in which the polymer and silica fine particles were dispersed in butyl acetate. The dispersion was diluted with ion exchanged water to a solid contend of about 1% by weight, and the average particle diameter (volume diameter) of the resulting fine particles was measured with a laser diffraction/diffusion-type particle size distribution measuring apparatus (trade name "LS230" manufactured by Coulter Inc.), and was found to be 0.18 μm (180 nm).

(Preparation of Silica Composite Polymer Particle)

900 g of deionized water in which 0.5 g of polyvinyl alcohol (PVA-205 manufactured by Kuraray Co., Ltd.) had been dissolved was placed into a flask equipped with a stirrer, an inert gas introducing tube, a refluxing condenser and a thermometer. Then, a mixture obtained by blending 75 g of methyl methacrylate, 19 g of ethylene glycol dimethacrylate, 20 g of the above-obtained dispersion and 1 g of azobisisobutyronitrile was placed into a flask, and this was stirred with a T.K. homogenizer (manufactured by Tokushu Kika Kogyo Co., Ltd.) at 3000 rpm for 5 minutes to prepare a uniform suspension.

Then, the suspension was heated to 75° C. while blowing into a nitrogen gas, stirring was continued at this temperature for 5 hours to perform a polymerization reaction, the reaction mixture was cooled, and the suspension was filtered, washed and dried to obtain composite particles. The composite particles had a structure in which silica particle was dispersed in a polymer particle derived from a polymerizable vinyl monomer. The volume-average particle diameter of the polymer particles is 12 μm, and Tg of a polymer part derived from a polymerizable vinyl-based monomer could not be confirmed until 260° C. at which the particle began to be degraded by heating because that part had a crosslinked structure. The specular reflectance of the particle is shown in Table 1.

Comparative Example 6

According to the same manner as that of Comparative Example 4 except that a particle diameter of droplets was adjusted to about 5 μm, polymer particles were obtained. The volume-average particle diameter of the polymer particles is 5 μm, and Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Comparative Example 7

According to the same manner as that of Comparative Example 4 except that 5 g of lipophilic Smectite (trade name "SAN" manufactured by Coap Chemical) was uniformly dispersed in the monomer composition of Comparative Example 4, and a particle diameter of droplets was adjusted to about 6 μm (stirring condition with a homomixer was at 10000 rpm for 10 seconds), Smectite-dispersed composite particles were obtained. The volume-average particle diameter of the resulting polymer particles is 6 μm, and Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Example 12

According to the same manner as that of Example 7 except that divinylbenzene was used in place of ethylene glycol dimethacrylate, polymer particles coated with silica in which a surface of a polymer particle was exposed were obtained. The volume-average particle diameter of the resulting polymer particle is 20 μm, and Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Example 13

According to the same manner as that of Example 7 except that 56 g of styrene and 20 g of divinylbenzene were used as a polymerizable vinyl monomer, polymer particles coated with silica in which a surface of a polymer particle was exposed were obtained. The volume-average particle diameter of the resulting polymer particles is 12 μm, and Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Example 14

According to the same manner as that of Example 12 except that MKC silicate MS58B15 (manufactured by Mitsubishi Chemical Co., Ltd.: average molecular weight 1600 to 1800) was used as a polyalkoxysiloxane oligomer, polymer particles coated with silica in which a surface of a polymer particle was exposed were obtained. The volume-average particle diameter of the resulting polymer particles is 15 μm, and Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Comparative Example 8

500 g of deionized water in which 0.05 g of sodium laurylsulfate had been dissolved was placed in a polymerization vessel equipped with a stirrer and a thermometer, and 50 g of tri calcium phosphate was added to disperse the material. Then, a mixed solution obtained by dissolving 0.5 g of benzoyl peroxide and 0.5 g of azobisisobutyronitrile in 80 g of styrene and 20 g of divinylbenzene which are a polymerizable vinyl monomer was placed in the polymerization vessel, and the materials were dispersed with a T.K homomixer (manufactured by Tokushu Kika Kogyo Co., Ltd.) to adjust droplets to about 12 μm. Then, the interior of the polymerization vessel was heated to 65° C. to perform suspension polymerization while stirring, followed by cooled. The suspension was filtered, washed and dried to obtain spherical polymerization particles. The volume-average particle diameter of the resulting polymer particles is 12 μm, Tg of a polymer part derived from a polymerizable vinyl-based monomer could not be confirmed until 260° C. at which particles began to be degraded by heating because that part had a crosslinked structure. The specular reflectance, the aperture ratio, h/D and the refractive index of the particle are shown in Table 1.

Comparative Example 9

According to the same manner as that of Comparative Example 8 except that a polymerizable vinyl monomer was changed to 80 g of methyl methacrylate and 20 g of divinylbenzene, spherical polymer particles were obtained. The volume-average particle diameter of the resulting polymer particles is 20 µm, and Tg of a polymer part derived from a polymerizable vinyl-based monomer could not be confirmed until 260° C. at which the particle began to be degraded by heating because that part had a crosslinked structure. The specular reflectance, the aperture ratio, h/D and the refractive index of the particle are shown in Table 1.

Example 15

According to the same manner as that of Example 13 except that, after a polymer particle part was polymerized as in Example 13, a catalyst for curing a polyalkoxysiloxane oligomer was changed from 2 g of sodium hydroxide to 2 g of sodium sulfamate which is an acid, and the curing temperature was 80° C., polymer particles coated with silica in which a surface of a polymer particle was exposed were obtained. The volume-average particle diameter of the resulting polymer particles is 20 µm, and Tg of a polymer particle derived from a polymerizable vinyl-based monomer could not be confirmed until 260° C. at which particles began to be degraded because that part had a crosslinked structure. The specular reflectance, the aperture ratio, h/D and the refractive index of the particle are shown in Table 1.

Example 16

According to the same manner as that of Example 13 except that 56 g of methyl methacrylate and 14 g of divinylbenzene were changed to 35 g of methyl methacrylate, 21 g of styrene and 14 g of ethylene glycol dimethacrylate, polymer particles coated with silica in which a surface of a polymer particle was exposed were obtained. The volume-average particle diameter of the resulting polymer particles is 20 µm, and Tg of a polymer part derived from a polymerizable vinyl-based monomer could not be confirmed until 26° C. at which particles began to be degraded by heating because that part had a crosslinked structure. The specular reflectance, the aperture ratio, h/D and the refractive index of the particle are shown in Table 1.

Example 17

According to the same manner as that of Example 13 except that an amount of methyl methacrylate was 20 g, an amount of divinylbenzene was 5 g, an amount of a polyalkoxysiloxane oligomer was 75 g, and 4 g of sodium chloride was added to water which is a dispersing medium, polymer particles coated with silica in which a surface of a polymer particle was exposed were obtained. The volume-average particle diameter of the resulting polymer particles is 15 µm, and Tg of a polymer part derived from a polymerizable vinyl-based monomer could not be confirmed until 260° C. at which particles began to be degraded by heating because that part had a crosslinked structure. The specular reflection, the aperture ratio, h/D and the refractive index of the particle are shown in Table 1.

TABLE 1

|  | specular reflection(%) | aperture ratio | h/D | refractive index |
|---|---|---|---|---|
| EX.1 | 11.3 | 0.56 | 0.78 | 1.490 |
| EX.2 | 10.6 | 0.16 | 0.92 | 1.490 |
| EX.3 | 11.7 | 0.61 | 0.72 | 1.490 |
| EX.4 | 11.9 | 0.69 | 0.70 | 1.490 |
| EX.5 | 9.6 | 0.58 | 0.77 | 1.590 |
| EX.6 | 10.9 | 0.52 | 0.79 | 1.480 |
| EX.7 | 10.9 | 0.55 | 0.79 | 1.490 |
| EX.8 | 9.5 | 0.59 | 0.76 | 1.590 |
| EX.9 | 11.1 | 0.61 | 0.73 | 1.490 |
| EX.10 | 11.7 | 0.62 | 0.72 | 1.490 |
| EX.11 | 10.2 | 0.60 | 0.69 | 1.530 |
| EX.12 | 10.1 | 0.65 | 0.64 | 1.510 |
| EX.13 | 9.9 | 0.48 | 0.65 | 1.590 |
| EX.14 | 11.5 | 0.63 | 0.74 | 1.510 |
| EX.15 | 9.8 | 0.67 | 0.67 | 1.510 |
| EX.16 | 10.4 | 0.72 | 0.78 | 1.520 |
| EX.17 | 10.4 | 0.18 | 0.93 | 1.510 |
| COM. EX.1 | 14.7 | — | — | 1.490 |
| COM. EX.2 | 15.1 | 1 | 0.36 | 1.490 |
| COM. EX.3 | 13.7 | — | — | 1.590 |
| COM. EX.4 | 15.0 | — | — | 1.490 |
| COM. EX.5 | 14.5 | — | — | 1.510 |
| COM. EX.6 | 14.7 | — | — | 1.490 |
| COM. EX.7 | 14.4 | — | — | 1.490 |
| COM. EX.8 | 13.7 | — | — | 1.590 |
| COM. EX.9 | 14.1 | — | — | 1.510 |
| Silica particle | 16.9 | — | — | — |

Silica particle: TOKUSEAL U (made by Tokuyama Corp., particle diameter: 14 µm)

From Examples 1 to 17 and Comparative Examples 1 to 9, the following can be seen.

From Examples 1 to 6 and Comparative Example 1, when a polymer particle coated with silica in which a surface of a polymer particle is exposed, and a polymer particle coated with silica in which the surface is not exposed are compared, it is seen that the former has small specular reflectance, and has excellent light diffusibility and reflectivity as shown in Table 1.

From Comparative Example 2, it is seen that when a region of a silica film covering the polymer particle is small, a silica film is peeled, and sufficient light diffusibility and reflectivity are not obtained.

From Example 6, it is seen that the method of this invention is not limited to a kind of the polymer particle, but even when Tg is low, the polymer particle coated with silica can be provided.

From Examples 7 to 17, it is seen that, even when the polymer particle is crosslinked, the polymer particle coated with silica can be provided.

From Examples 7 to 17 and Comparative Examples 3 to 4, and 6 to 9, it is seen that, by having a silica film, excellent light diffusibility and reflectivity are possessed.

From Examples 7 to 11 and Comparative Example 5, it is seen that particles in which a silica film is formed has more excellent light diffusibility and reflectivity than the case where the silica particle is dispersed.

From Examples 1 to 17, it is seen that the silica particle in which a value of h/D is in a range of $0.5 \leq h/D < 1$ have suitable diffusibility and reflectivity. When a value of h/D is less than 0.5, a silica film is easily peeled from the polymer particle and, when a value of h/D is 1, light diffusibility and reflectivity become poor.

Examples and Comparative Examples of Coating Composition

Example 18

100 parts by weight of the polymer particles coated with silica prepared in Example 7 was blended in a binder solution in which 100 parts by weight of a polyacrylate resin (trade name "BR106", manufactured by Mitsubishi Rayon Co., Ltd.) as a binder resin had been dissolved in 300 parts by weight of a solvent (toluene 180 parts by weight, ethyl acetate 90 parts by weight, butyl acetate 30 parts by weight), and the materials were uniformly dispersed to prepare a coating composition.

This coating composition was coated on a polyethylene terephthalate film having a thickness of 100 μm which is a transparent substrate using a 75 μm applicator, and dried to prepare a light diffusing sheet.

The haze and the total light transmittance of a surface of this light diffusing sheet were measured by the aforementioned methods, respectively. The results are shown in the following Table 2.

Example 19

According to the same manner as that of Example 18 except that 20 parts by weight of the polymer particles coated with silica obtained in Example 8 was used, a light diffusing sheet was prepared. The haze and the total light transmittance of a surface of the resulting light diffusing sheet were measured. The results are shown in the following Table 2.

Example 20

According to the same manner as that of Example 18 except that 70 parts by weight of the polymer particles coated with silica obtained in Example 10 was used, a light diffusing sheet was prepared. The haze and the total light transmittance of a haze of surface of the resulting light diffusing sheet were measured. The results are shown in the following Table 2.

Example 21

According to the same manner as that of Example 18 except that an addition amount of the polymer particles coated with silica to be added was changed to 150 parts by weight, a light diffusing sheet was prepared. The haze and the total light transmittance of a surface of the resulting light diffusing sheet were measured. The results are shown in the following Table 2.

Comparative Example 11

According to the same manner as that of Example 18 except that the polymer particles obtained in Comparative Example 3 were used at an amount of 3 g per 300 g of a methyl methacrylate resin in place of the polymer particles coated with silica, a light diffusing sheet was obtained. The haze and the total light transmittance of a surface of the resulting light diffusing sheet were measured. The results are shown in the following Table 2.

Comparative Example 12

According to the same manner as that of Example 18 except that the polymer particles obtained in Comparative Example 4 were used in place of the polymer particles coated with silica, a light diffusing sheet was obtained. And, the haze and the total light transmittance of a surface of the resulting light diffusing sheet were measured. The results are shown in the following Table 2.

Comparative Example 13

According to the same manner as that of Example 18 except that the polymer particles coated with silica obtained in Comparative Example 5 were used, a light diffusing sheet was obtained. And, the haze and the total light transmittance of a surface of the resulting light diffusing sheet were measured. The results are shown in the following Table 2.

Comparative Example 14

According to the same manner as that of Example 18 except that the polymer particles coated with silica obtained in Comparative Example 7 were used, a light diffusing sheet was obtained. And, the haze and the total light transmittance of a surface of the resulting light diffusing sheet were measured. The results are shown in the following Table 2.

TABLE 2

|  | haze (%) | total light transmittance(%) |
|---|---|---|
| EX.18 | 94.11 | 88.55 |
| EX.19 | 94.36 | 86.75 |
| EX.20 | 95.12 | 86.02 |
| EX.21 | 94.53 | 85.78 |
| COM. EX.11 | 0.54 | 96.28 |
| COM. EX.12 | 92.66 | 81.12 |
| COM. EX.13 | 91.32 | 83.21 |
| COM. EX.14 | 93.23 | 80.87 |

As recognized from Comparative Examples 11 to 14 in Table 2, usually, when the haze is increased, the total light transmittance is decreased and, when the total light transmittance is increased, the haze is decreased (in particular, Comparative Example 11). That is, usually, increase in the haze means reduction in the total light transmittance, and increase in the total light transmittance means reduction in the haze.

However, as apparent from comparison with Comparative Examples 12 to 14, in the optical sheets of Examples 18 to 21, both of the haze and the total light transmittance are improved than those of Comparative Examples.

As apparent from this, by using a polymer particle coated with silica in which a silica film is provided so as to expose the polymer particle as a particle to be blended in a coating composition, the resulting optical sheet (optical member) can be excellent in both of the light diffusibility (haze) and the total light transmittance. Therefore, it is recognized that this is suitable in a light diffusing sheet, for example, a light diffusing sheet which is disposed between a prism sheet and a light guide plate in a liquid crystal display device.

Example 22

10 parts by weight of the polymer particles coated with silica prepared in Example 9 was blended in a binder solution obtained by dissolving 100 parts by weight of a polyester resin (trade name "Biron 200" manufactured by Toyobo Co., Ltd.) which is a binder resin in 300 parts by weight of a solvent (toluene 180 parts by weight, ethyl acetate 90 parts by weight, butyl acetate 30 parts by weight), and the materials were uniformly dispersed to prepare a coating composition.

This coating composition was coated on a polyethylene terephthalate film having a thickness of 100 μm which is a transparent substrate using a 20 μm applicator, and dried to obtain an antiglare sheet. And, the haze, the total light transmittance and the specular reflectance of a surface of the resulting antiglare sheet were measured. The results are shown in the following Table 3.

Example 23

According to the same manner as that of Example 22 except that 5 parts by weight of the polymer particles coated with silica obtained in Example 10 was used, an antiglare sheet was obtained. And, the haze, the total light transmittance and the specular reflectance of a surface of the resulting antiglare sheet were measured. The results are shown in the following Table 3.

Example 24

According to the same manner as that of Example 22 except that 20 parts by weight of the polymer particles coated with silica obtained in Example 11 was used, an antiglare sheet was obtained. And, the haze, the total light transmittance and the specular reflectance of a surface of the resulting antiglare sheet were measured. The results are shown in the following Table 3.

Comparative Example 15

According to the same manner as that of Example 22 except that the polymer particles obtained in Comparative Example 6 were used in place of the polymer particles coated with silica used in Example 22, an antiglare sheet was obtained. And, the haze, the total light transmittance and the specular reflectance of a surface of the resulting antiglare sheet were measured. The results are shown in the following Table 3.

Comparative Example 16

According to the same manner as that of Example 22 except that the polymer particles coated with silica obtained in Comparative Example 5 were used, an antiglare sheet was obtained. And, the haze, the total light transmittance and the specular reflectance of a surface of the resulting antiglare sheet were measured. The results are shown in the following Table 3.

Comparative Example 17

According to the same manner as that of Example 22 except that the polymer particles coated with silica obtained in Comparative Example 7 were used, an antiglare sheet was obtained. And, the haze, the total light transmittance and the specular reflectance of surface of the resulting antiglare sheet were measured. The results are shown in the following Table 3.

TABLE 3

|  | haze (%) | total light transmittance(%) | specular reflectance(%) |
|---|---|---|---|
| EX.22 | 32.56 | 92.76 | 20.45 |
| EX.23 | 33.72 | 92.45 | 25.37 |
| EX.24 | 34.17 | 91.78 | 21.69 |
| COM. EX.15 | 30.21 | 90.81 | 42.34 |
| COM. EX.16 | 30.21 | 90.93 | 38.22 |
| COM. EX.17 | 31.22 | 89.97 | 33.64 |

As apparent from Table 3, in optical sheets of Examples 22 to 24, both of the haze and the total light transmittance are improved than those of Comparative Examples. Moreover, the specular reflectance is considerably reduced.

As apparent from this, by using the polymer particle coated with silica in which a silica film is provided so as to expose a polymer particle as a particle to be blended in a coating composition, the resulting optical sheet (optical member) is excellent in both of the light diffusibility (haze) and the total light transmittance and, moreover, can have very small specular reflectance. Therefore, it is recognized that this is suitable in an antiglare sheet, for example, an antiglare sheet disposed on the superficialmost side in a liquid crystal display device.

Example 25

50 parts by weight of the polymer particle coated with silica obtained in Example 7 was blended in 400 parts by weight of an aqueous binder solution (trade name "Bironal MD1200", manufactured by Toyobo Co., Ltd.) (binder resin about 30 parts by weight) using a polyester resin as a binder resin, and water and alcohol as a solvent, and the materials were uniformly dispersed to obtain a coating composition. This coating composition was coated on a white black covering paper (manufactured by BYK-Garder) using a 75 μm applicator, and dried to prepare a coated article. And, the specular reflectance of a surface of the resulting coated article was measured.

In addition, re-dispersibility of the prepared coating composition was assessed. The results are shown in the following Table 4.

Example 26

According to the same manner as that of Example 25 except that 10 parts by weight of the polymer particles coated with silica obtained in Example 8 was used, a coating composition was prepared. In addition, as in Example 25, measurement of the specular reflectance and assessment of re-dispersibility were performed. The results are shown in the following Table 4.

Example 27

According to the same manner as that of Example 25 except that 100 parts by weight of the polymer particles coated with silica obtained in Example 11 was used, a coating composition was prepared. In addition, as in Example 25, measurement of the specular reflectance and assessment of re-dispersibility were performed. The results are shown in the following Table 4.

Comparative Example 18

According to the same manner as that of Example 24 except that 10 parts by weight of the polymer particles obtained in Comparative Example 4 was used in place of the polymer particle coated with silica used in Example 25, a coating composition was prepared. In addition, as in Example 25, measurement of the specular reflectance and assessment of re-dispersibility were performed. The results are shown in the following Table 4.

Comparative Example 19

According to the same manner as that of Example 25 except that 10 parts by weight of the polymer particles coated with silica obtained in Comparative Example 5 was used, a coating composition was prepared. In addition, as in Example 25, measurement of the specular reflectance and assessment of re-dispersibility were performed. The results are shown in the following Table 4.

Comparative Example 20

According to the same manner as that of Example 25 except that the polymer particles coated with silica were not blended, a coating composition was prepared. In addition, as in Example 25, measurement of the specular reflectance was performed. The results are shown in the following Table 4.

Comparative Example 21

According to the same manner as that of Example 25 except that 20 parts by weight of the polymer particles coated with silica obtained in Comparative Example 7 was used, a coating composition was prepared. In addition, as in Example 25 measurement of the specular reflectance and assessment of re-dispersibility were performed. The results are shown in the following Table 4.

Example 28

50 parts by weight of the composite particles obtained in Example 1 was blended in 400 parts by weight of an aqueous binder solution (trade name "Bironal MD1200", manufactured by Toyobo Co., Ltd.) (binder resin about 120 parts by weight) using a polyester resin as a binder resin, and water and alcohol as a solvent, and the materials were uniformly dispersed to prepare a coating composition. This coating composition was coated on a white black covering paper (manufactured by BYK-Garder) using a 75 μm applicator, and dried to prepare a coated article. And, the specular reflectance of a surface of the resulting coated article was measured.

In addition, assessment of dispersibility of the prepared coating composition was performed. The results are shown in the following Table 4.

Example 29

According to the same manner as that of Example 28 except that 50 parts by weight of the particles of Example 3 was used, a coated article was prepared. And, the specular reflectance of a surface of the resulting coated article was measured.

In addition, assessment of dispersibility of the prepared coating composition was performed. The results are shown in the following Table 4.

Example 30

According to the same manner as that of Example 28 except that 50 parts by weight of the particles of Example 4 was used, a coated article was prepared. And, the specular reflectance of a surface of the resulting coated article was measured.

In addition, assessment of dispersibility of the prepared coating composition was performed. The results are shown in the following Table 4.

Example 31

According to the same manner as that of Example 27 except that 50 parts by weight of the particles of Example 6 was used, a coated article was prepared. And, the specular reflectance of a surface of the resulting coated article was measured.

In addition, assessment of dispersibility of the prepared coating composition was performed. The results are shown in the following Table 4.

TABLE 4

|  | specular reflectance (%) | assessment of dispersibility |
| --- | --- | --- |
| EX.25 | 19.88 | ○ |
| EX.26 | 27.54 | ○ |
| EX.27 | 15.23 | ○ |
| EX.28 | 20.17 | ○ |
| EX.29 | 19.38 | ○ |
| EX.30 | 18.42 | ○ |
| EX.31 | 20.53 | ○ |
| COM. EX.18 | 36.43 | X |
| COM. EX.19 | 35.92 | X |
| COM. EX.20 | 78.98 | — |
| COM. EX.21 | 29.96 | X |

As apparent from Table 4, it is recognized that the coating composition of this invention has better re-dispersibility, that is, dispersibility stability also in an aqueous system.

Examples and Comparative Examples of Molded Article

Example 32

30 g of the polymer particles coated with silica obtained in Example 12 was added to 300 g of a methyl methacrylate resin (MG-5 manufactured by Sumitomo Chemical Co., Ltd., refractive index 1.49), the materials were blended with a food mixer for 3 minutes, supplied to an injection molding machine, and injection-molded to obtain a light diffusible molded article having a length of 100 mm, a width of 50 mm and a thickness of 2 mm.

The total light transmittance, the haze and the diffused light transmittance of this light diffusible molded article were measured by the aforementioned methods, respectively. The results are shown in the following Table 5.

Example 33

According to the same manner as that of Example 32 except that an amount of the polymer particles coated with silica to be added was 45 g per 300 g of a methyl methacrylate resin, a light diffusible molded article was obtained. Further, as in Example 32, the total light transmittance, the haze and the diffused light transmittance were measured. The results are shown in the following Table 5.

Example 34

According to the same manner as that of Example 32 except that 3 g of the polymer particles coated with silica obtained in Example 14 was used per 300 g of a methyl methacrylate resin, a light diffusible molded article was obtained. Further, as in Example 32, the total light transmittance, the haze and the diffused light transmittance were measured. The results are shown in the following Table 5.

Example 35

According to the same manner as that of Example 32 except that 30 g of the polymer particles coated with silica of Example 15 as a polymer particle coated with silica was used per 300 g of a methyl methacrylate resin, a light diffusible molded article was obtained. Further, as in Example 32, the total light transmittance, the haze and the diffused light transmittance were measured. The results are shown in the following Table 5.

Comparative Example 22

According to the same manner as that of Example 32 except that 3 g of the polymer particles obtained in Comparative Example 8 was used per 300 g of a methyl methacrylate resin in place of the polymer particles coated with silica, a molded article was obtained. Further, as in Example 32, the total light transmittance, the haze and the diffused light transmittance were measured. The results are shown in the following Table 5.

Comparative Example 23

According to the same manner as that of Example 32 except that 30 g of the polymer particles obtained in Comparative Example 9 was used per 300 g of a methyl methacrylate resin in place of the polymer particles coated with silica, a molded article was obtained. Further, as in Example 32, the total light transmittance, the haze and the diffused light transmittance were measured. The results are shown in the following Table 5.

Comparative Example 24

According to the same manner as that of Example 32 except that 45 g of the polymer particles coated with silica obtained in Comparative Example 5 was used per 300 g of a methyl methacrylate resin as a polymer particles coated with silica, a molded article was obtained. Further, as in Example 32, the total light transmittance, the haze and the diffused light transmittance were measured. The results are shown in the following Table 5.

Comparative Example 25

According to the same manner as that of Example 32 except that polymer particles coated with silica were not blended, and only a methyl methacrylate resin was used, a molded particle was obtained. Further, as in Example 32, the total light transmittance, the haze and the diffused light transmittance were measured. The results are shown in the following Table 5.

Example 36

According to the same manner as that of Example 32 except that the composite particles obtained in Example 15 were used, a light diffusible molded article was obtained. Further, as in Example 32, the total light transmittance, the haze and the diffused light transmittance were measured. The results are shown in the following Table 5.

Example 37

According to the same manner as that of Example 32 except that the polymer particles coated with silica obtained in Example 16 were used, a light diffusible molded article was obtained. Further, as in Example 32, the total light transmittance, the haze and the diffused light transmittance were measured. The results are shown in the following Table 5.

Example 38

According to the same manner as that of Example 32 except that 45 g of the polymer particles coated with silica obtained in Example 17 was used, a light diffusing molded particle was obtained. Further, as in Example 32, the total light transmittance, the haze and the diffused light transmittance were measured. The results are shown in the following Table 5.

Example 39

3 g of the polymer particles coated with silica obtained in Example 5 was added to 300 g of a methyl methacrylate resin (MG-5 manufactured by Sumitomo Chemical Co., Ltd., refractive index 1.49), the materials were blended with a food mixer for 3 minutes, supplied to an injection molding machine, and injection-molded to obtain a light diffusible molded article having a length of 100 mm, a width of 50 mm and a thickness of 2 mm.

The total light transmittance, the haze and the diffused light transmittance of this light diffusible molded article were measured by the aforementioned methods, respectively. The results are shown in the following Table 5.

TABLE 5

|  | total light transmittance(%) | haze (%) | diffused light transmittance(%) |
|---|---|---|---|
| EX.32 | 83.17 | 97.55 | 81.13 |
| EX.33 | 81.79 | 98.77 | 80.78 |
| EX.34 | 89.25 | 90.21 | 80.51 |
| EX.35 | 82.95 | 98.23 | 81.48 |
| EX.36 | 83.52 | 97.39 | 81.34 |
| EX.37 | 81.21 | 98.56 | 80.04 |
| EX.38 | 84.23 | 95.48 | 80.42 |
| EX.39 | 88.93 | 91.83 | 81.66 |
| COM. EX.22 | 81.56 | 87.78 | 71.59 |
| COM. EX.23 | 76.32 | 94.38 | 72.03 |
| COM. EX.24 | 76.21 | 96.59 | 73.61 |
| COM. EX.25 | 92.34 | 0.83 | 0.77 |

As apparent from Table 5, since the light diffusible molded article of this invention retains the higher total light transmittance and the higher haze as compared with the molded article in which the conventional polymer particle or composite particle was blended, the diffused light transmittance is as high as 80% or more, and it is recognized that the diffused light is effectively transmitted.

The polymer particle coated with silica of this invention is excellent in light diffusibility and reflectivity, and can be utilized in many utilities such as paints, by utilizing those properties. Further, since the polymer particle coated with silica of this invention is excellent in light diffusibility and reflectivity and, further, the method for producing the polymer particle coated with silica of this invention can produce the particle without applying a strong mechanical shear force, the polymer particle having low Tg can be easily coated with a silica film.

In addition, since the coated article of this invention has the suppressed surface specular reflectance, it is effective in the field requiring matting and glare protection. In particular, since the optical member of this invention can be excellent in the light transmittance and the light diffusibility, it is effective in the field requiring the high light diffusibility and light transmittability, such as an illumination equipment cover, a light guide plate, and a screen for a projection television.

Further, the light diffusible molded article containing the polymer particle coated with silica of this invention can be used optical components such as illumination equipment cover, lens, electroconductive plate, video disc, and screen for projection television, cosmetic container, front plate of vendor machine, signboard, merchandise display, and table container.

The invention claimed is:

1. A spherical or approximately spherical particle comprising: a polymer particle derived from a polymerizable vinyl-based monomer; and
    a silica film covering the polymer particle, which makes a surface of the polymer particle exposed so that an aperture ratio of 0.1 to 1 is possessed and a height h of the silica film and a diameter D of the polymer particle coated with silica have a relationship of $0.5 \leq h/D < 1$, wherein the silica film includes a polyalkoxysiloxane oligomer condensate.

2. A coating composition comprising: a polymer particle coated with silica comprising a polymer particle derived from a polymerizable vinyl-based monomer, and a silica film covering the polymer particle, which makes a surface of the polymer particle exposed so that an aperture ratio of 0.1 to 1 is possessed and a height h of the silica film and a diameter D of the polymer particle coated with silica have a relationship of $0.5 \leq h/D < 1$, the silica film including a polyalkoxysiloxane oligomer condensate; and a binder solution, wherein the binder solution contains a binder resin and a solvent.

3. The coating composition according to claim 2, wherein an amount of the polymer particle coated with silica to be blended is 1 to 150 parts by weight per 100 parts by weight of the binder resin.

4. A coated article, wherein the coating composition according to claim 2 is coated on a substrate.

5. An optical member, wherein the coating composition according to claim 2 is coated on a transparent substrate.

6. The optical member according to claim 5, wherein an amount of the polymer particle coated with silica to be blended is 20 to 120 parts by weight per 100 parts by weight of the binder resin.

7. A liquid crystal display wherein the optical member according to claim 6 is used.

8. A method for producing the polymer particle coated with silica according to claim 1, wherein the polyalkoxysiloxane oligomer has a weight-average molecular weight of 300 to 3000.

9. A light diffusible molded article comprising a transparent resin and a polymer particle coated with silica, wherein the polymer particle coated with silica comprises a polymer particle derived from a polymerizable vinyl-based monomer, and a silica film covering the polymer particle, which makes a surface of the polymer particle exposed so that an aperture ratio of 0.1 to 1 is possessed and a height h of the silica film and a diameter D of the polymer particle coated with silica have a relationship of $0.5 \leq h/D < 1$, and the silica film includes a polyalkoxysiloxane oligomer condensate.

10. The light diffusible molded article according to claim 9, wherein the polymer particle coated with silica has a difference in a refractive index from that of the transparent resin of 0.01 to 0.10, and the diffused light transmittance represented by an (equation), diffused light transmittance (%)=total light transmittance (%)×haze (%)×0.01, has a value of 80% or more.

11. The light diffusible molded article according to claim 9, wherein an amount of the polymer particle coated with silica to be blended is 0.1 to 20 parts by weight per 100 parts by weight of the transparent resin.

12. A method for producing a polymer particle coated with a silica film which makes a surface of the polymer particle exposed so that an aperture ratio of 0.1 to 1 is possessed, and a height h of the silica film and a diameter D of the polymer particle coated with silica have a relationship of $0.5 \leq h/D < 1$, the method comprising, in the following order, the steps of:
    uniformly mixing 100 parts by weight of a polymerizable vinyl-based monomer, 10 to 500 parts by weight of a polyalkoxysiloxane oligomer which is inert to the polymerizable vinyl-based monomer, and 0.01 to 10 parts by weight of a polymerization initiator to obtain a monomer composition;
    aqueous suspension-polymerizing the polymerizable vinyl-based monomer in the monomer composition in the presence of a suspension stabilizer to obtain a polymer particle; and
    adding an acid or base catalyst to condense the polyalkoxysiloxane oligomer.

* * * * *